(12) United States Patent
Stewart et al.

(10) Patent No.: US 7,443,046 B2
(45) Date of Patent: Oct. 28, 2008

(54) WAVE ENERGY CONVERTER UTILIZING INTERNAL REACTION MASS AND SPRING

(75) Inventors: David B. Stewart, Cranbury, NJ (US); James S. Gerber, St. Paul, MN (US)

(73) Assignee: Ocean Power Technologies, Inc, Pennington, NJ (US)

( * ) Notice: Subject to any disclaimer, the term of this patent is extended or adjusted under 35 U.S.C. 154(b) by 0 days.

(21) Appl. No.: 11/607,386

(22) Filed: Dec. 1, 2006

(65) Prior Publication Data
US 2007/0126239 A1 Jun. 7, 2007

Related U.S. Application Data

(60) Provisional application No. 60/741,108, filed on Dec. 1, 2005.

(51) Int. Cl.
*F03B 13/12* (2006.01)
(52) U.S. Cl. .......................................... 290/53; 290/42
(58) Field of Classification Search .................... 290/53
See application file for complete search history.

(56) References Cited

U.S. PATENT DOCUMENTS 3,696,251 A * 10/1972 Last et al. ..................... 290/53
6,392,314 B1 * 5/2002 Dick ............................ 290/53
2006/0208839 A1 * 9/2006 Taylor et al. ................. 335/205

FOREIGN PATENT DOCUMENTS

JP 55125364 A * 9/1980
JP 55160967 A * 12/1980

* cited by examiner

*Primary Examiner*—Joseph Waks
(74) *Attorney, Agent, or Firm*—Henry I. Schanzer, Esq.

(57) ABSTRACT

A wave energy converter (WEC) includes a shell suitable for being placed within a body of water. The shell contains an internal oscillator comprising a "reaction mass" and a spring mechanism coupled between the reaction mass and the shell. The shell and internal oscillator are constructed such that, when placed in a body of water and in response to waves in the body of water, there is relative motion between the shell and the internal oscillator's mass. A power take-off (PTO) device is coupled between the internal oscillator and the shell to convert their relative motion into electric energy. In systems embodying the invention, the spring mechanism is designed such that its displacement or movement is less than the displacement or movement of the reaction mass. The spring mechanism may be any device which enables the reaction mass to undergo a given replacement while its displacement or movement is less than that of the reaction mass. This property enables the size of the WEC to be more readily controlled (e.g., made smaller).

22 Claims, 15 Drawing Sheets

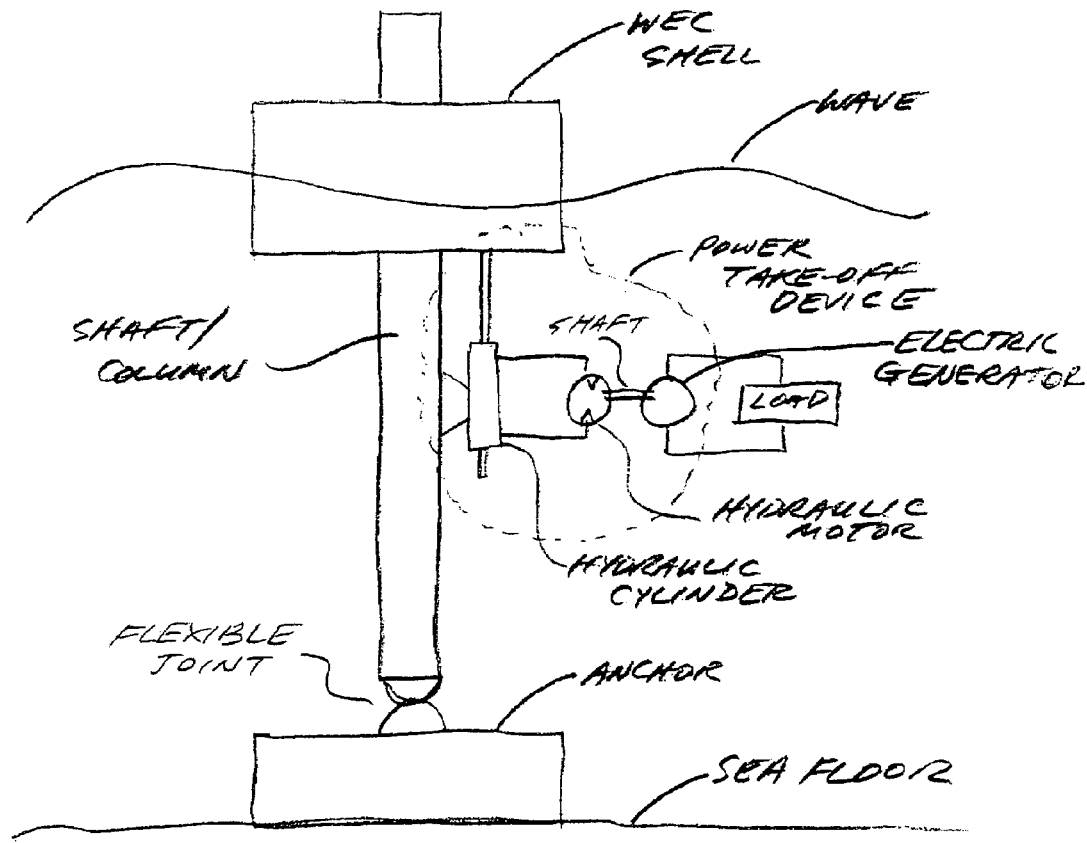
FIGURE 1 - PRIOR ART
SIMPLIFIED DIAGRAM OF
A TYPICAL WEC

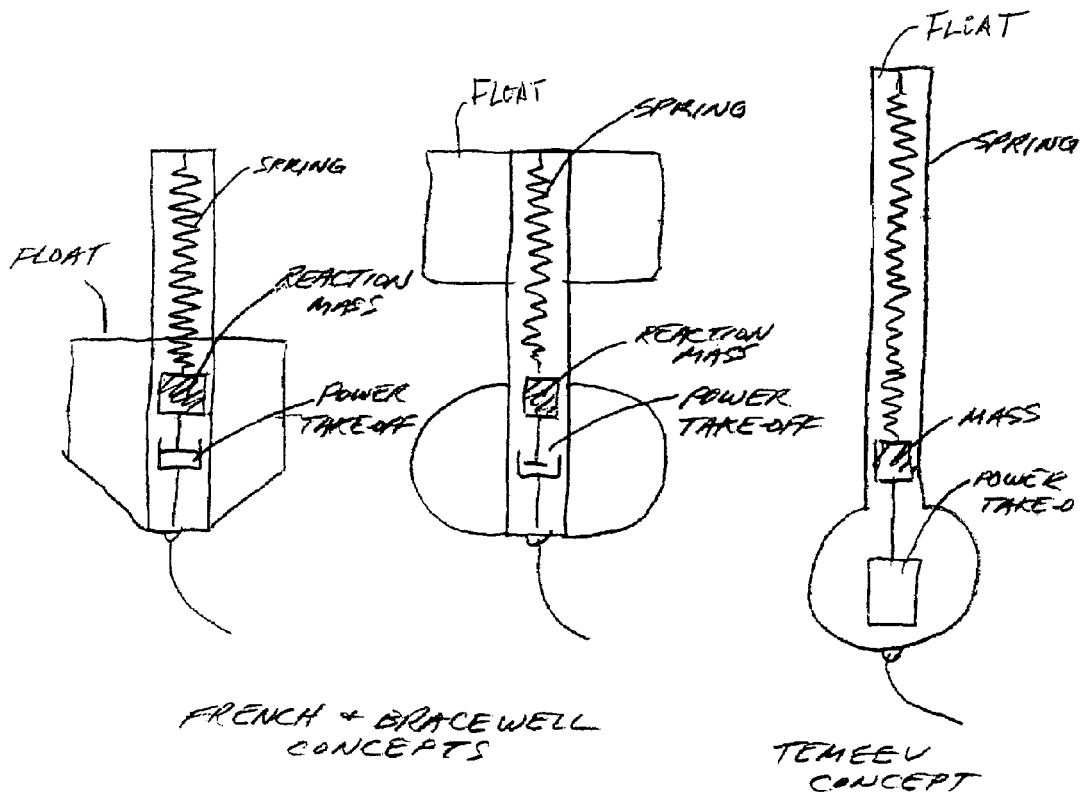
FIGURE 2 - PRIOR ART
PRIOR ART - INTERNAL MASS AND SPRING WECs

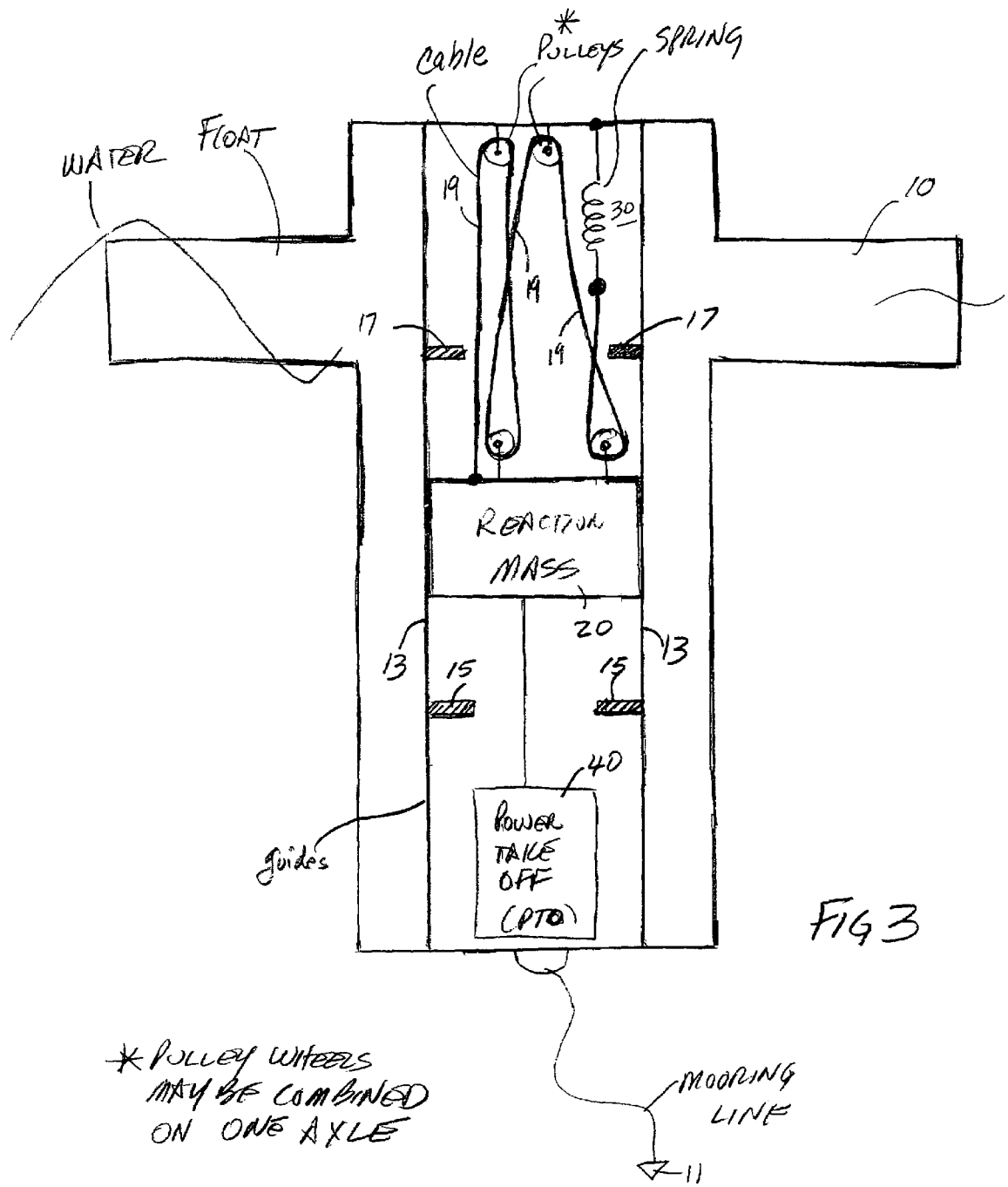

WEC WITH OSCILLATING MASS
ON COMPACT SPRING

WEC WITH OSCILLATING MASS ON COMPACT SPRING

WEC WITH OSCILLATING MASS ON COMPACT SPRING

WEC WITH OSCILLATING MASS
ON TORSIONAL SPRING

Mass on Spring WEC with Ball Screw, Gear Box and Torsion Spring

Reaction mass is mechanically connected to the power take-off device. The hydraulic cylinder body is connected to the float.

WAVE ENERGY CONVERTER UTILIZING INTERNAL REACTION MASS AND SPRING

BACKGROUND OF THE INVENTION

This application claims the benefit of Provisional Application No. 60/741,108 filed Dec. 1, 2005 and its teachings are incorporated herein by reference.

This invention relates to apparatus for converting energy present in surface waves of large bodies of water into useful electrical energy.

Various wave energy converter (WEC) systems are known. For example, reference is made to U.S. patent application Ser. No. 09/379,421 filed Aug. 21, 1999, titled "Wave Energy Converter Utilizing Pressure Difference", assigned to the assignee of the present application and the teachings of which are incorporated herein by reference.

Known WEC systems generally include a "float" (or "shell") and a "spar" (or "shaft" or "column" or "piston") which are designed to move relative to each other to convert the force of the waves into mechanical energy. In these systems, the float is generally depicted or referred to as the moving member and the spar as the non-moving or mechanically grounded member. But, the opposite may be the case. Alternatively, the spar and float may both move relative to each other.

In these prior art WEC systems, the float and spar are exposed to the water elements and forces. As shown in FIG. 1, a WEC generally includes a power-take-off device (PTO) coupled between the float (WEC shell) and the spar (shaft or column) to convert the mechanical power available from the WEC into electrical power. The PTO device may be any device capable of converting the relative motion between the float and spar into electrical energy. For example, the PTO device may be a linear-to-rotary translator (e.g. rack and pinion gear assembly, a ball screw assembly, a hydraulic cylinder and motor assembly, or a pneumatic cylinder and motor assembly) coupled to a rotary electric generator. The PTO device can also be a linear electric generator (LEG) that directly converts mechanical power to electric power using electromagnetic induction.

In some WEC systems the PTO device is placed in the water and is coupled to the float and spar. In other systems, a mechanical linkage (e.g. "pushrod") connected to one of the float and spar is attached to a PTO device located inside the other of the float and spar, with the pushrod passing through an air-tight seal.

Numerous problems exist in the design of such systems for harnessing the energy contained in water surface waves. Some of these problems include:

The bearings between the float and spar are complex and expensive because of the need to operate in water and to be subjected to marine growth, contamination and corrosion.

The power take-off device and its bearings are complex and expensive because of the need to operate in water and be subjected to marine growth, contamination and corrosion.

The mechanical linkage connecting a float to an internally mounted PTO is subject to marine growth, corrosion and contamination.

Wave forces and viscous damping limit the extent to which the float and spar can move relative to each other, thereby decreasing the potential for energy collection.

The efficiency of a "point absorber" type WEC is often limited by the viscous damping of the water.

The design of a mooring (anchoring) system for a WEC consisting of two or more objects that interact directly with the water and waves is often complex.

Some of the problems noted above have been recognized and addressed in the prior art, as discussed, for example, in: (1) Temeev, A., Antufyev, B., and Temeev, S.; "Simulation of Oscillatory Drive for Float Wave Energy Converter", in Fifth European Wave Energy Conference Proceedings, Hydraulics & Maritime Research Centre, Cork, Ireland, pp. 386-391, 2003; and (2) French, M. J. and Bracewell, R. H., "*Heaving Point-Absorbers Reacting Against an Internal Mass*", in Hydrodynamics of Ocean Wave-Energy Utilisation, Lisbon, Portugal, Springer-Verlag, pp 247-55, 1985. As suggested in these references some of the problems, discussed above, may be overcome by constructing a WEC with a "float" that is acted upon by the waves, a "reaction" mass that is totally contained within the float, and a spring and power take-off device that couple the reaction mass to the float. In this type of system, the enclosed mass (m) is suspended from or supported by a spring that is connected to the float and whose force constant (k) is tuned to give the desired natural period ($T_n$) of the WEC.

A problem with this approach (i.e., selecting the spring force characteristic to yield a desired natural period) is that the length of the spring is typically very large, and it is not practical to construct or house such a large spring within the float. The length of the spring in still water ($x_0$) can be determined by solving the two following equations simultaneously.

$$m \cdot g = k \cdot x \qquad \text{Equation 1}$$

$$\sqrt{k/m} = f_n = 2\pi/T_n \qquad \text{Equation 2}$$

Equation 1 shows that the downward force of the reaction mass (m·g) is equal to the upward force of the spring (k·x) in static conditions. Equation 2 shows that the mass (m) and spring force constant (k) can be selected to give the mass-spring oscillator a natural oscillating frequency near that of the predominant waves; where $T_n$ is equal to the period of the wave.

If the two equations are solved simultaneously, the still-water spring length ($x_0$) would be:

$$x_0 = (T_n/2\pi)^2 \cdot g \qquad \text{Equation 3}$$

If the mass-spring system is tuned for a 4-second wave (T), the length of the spring ($x_0$) would be approximately 4 meters. If the mass-spring system is tuned for an 8-second wave (T), the length of the spring ($x_0$) would be approximately 16 meters. Fabricating and locating such a large spring within a float presents many problems.

The problem with the need for a very long spring, described above, is overcome in systems embodying the invention as described below. This invention relates to a wave energy converter (WEC) that includes a "float" which is exposed to the surface waves, an internal "oscillator" formed by a mass and spring, and a power take-off device which is coupled between the mass and the float.

SUMMARY OF THE INVENTION

A wave energy converter (WEC) system embodying the invention includes a "shell" ("float" or "hull"), an internal oscillator comprising a "reaction mass" and a spring, mechanism. A power take-off (PTO) device is coupled between the shell and internal oscillator to convert their relative motion into electric energy. The shell and internal oscillator are constructed such that, when placed in a body of water and in response to waves in the body of water, there is relative motion between the shell and the internal oscillator's mass. In systems embodying the invention, the spring mechanism which connects the reaction mass to the shell can be a physical spring, such as a coil spring, a leaf spring or a torsional spring. Alternatively, the function of the spring mechanism may be obtained by controlling the PTO so it behaves like a spring (i.e. back-force increases with displacement); or by a combination thereof. The spring mechanism is designed such that, in systems embodying the invention, the displacement of the spring mechanism is less than the linear displacement of the reaction mass in response to a force causing their movement. This is an important aspect of the instant invention which differentiates it from the known art in that the length of the spring needed to practice the invention is reduced using "simple" or "compound" machines or mechanisms.

The PTO device can be any one of a number of devices, including a linear electric generator (LEG), or a translator that converts linear motion and force to rotary motion and torque, coupled to a rotary electric generator.

In systems embodying the invention, the WEC may have a "positive" system buoyancy such that it floats on the surface of the water and responds to changes in buoyant force due to passing waves, or the WEC may have a "neutral" system buoyancy such that it remains disposed within the volume of the body of water and responds to changes in hydrodynamic pressure due to passing waves.

In accordance with one embodiment of the invention, a physical spring is connected to the reaction mass by a "block and tackle" pulley system. In this system, the spring stiffness is increased by, and the spring displacement is decreased by, the multiplying ratio of the pulley system. It is much easier to construct a short, stiff spring than it is to construct a long, soft spring. It is also easier to fit such a spring inside a WEC buoy. Even if it were possible to construct a long spring with the proper force-displacement characteristic, the volume of the WEC buoy being occupied by the spring and reaction mass would cause the WEC buoy to be long and its hydrodynamic performance could be adversely impacted.

In accordance with another embodiment of the invention, the spring may be connected to the reaction mass by a long beam. In this case the spring would be located near the fulcrum such that a short, stiff spring reacts with the reaction mass in the same way that a long, softer, spring that is directly connected to the mass would react. Another advantage of this embodiment is that the shell end of the spring can be raised or lowered so as to put the neutral position of the mass in a desired position.

Applicants' invention also includes other embodiments which simulate springs with the desired still-water displacement and operational springiness. For example, it is possible to use a hydraulic cylinder coupled to a large accumulator. The size and pre-charge of the accumulator can be selected in a way so as to give the desired initial displacement and springiness (i.e., the elasticity and/or effective spring stiffness). The accumulator volume determines the springiness. The accumulator pressure pre-charge determines the initial displacement of the mechanically loaded hydraulic cylinder.

As further discussed below other embodiments have been devised by the Applicants to help keep the size and stiffness of the springs within a practical range.

In order to keep the pre-deployed or "dry" mass of the WEC to a minimum, the reaction mass can be a water tank that is filled only after the WEC is deployed in the water. It should be appreciated that WEC buoy batteries (functioning to store the converted energy) can also be used as the reaction mass.

BRIEF DESCRIPTION OF THE DRAWINGS

In the accompanying drawings, which are not drawn to scale, like reference characters denote like components; and FIG. 1 shows a generalized version of a prior art wave energy converter (WEC);

FIG. 2 shows several configurations of prior art WECs which include a float, a reaction mass, a PTO and a very long spring;

FIG. 3 depicts a WEC embodying the invention in which a pulley arrangement is used to enable the use of a "short" (compact) spring;

DETAILED DESCRIPTION OF THE INVENTION

Figure 3A:
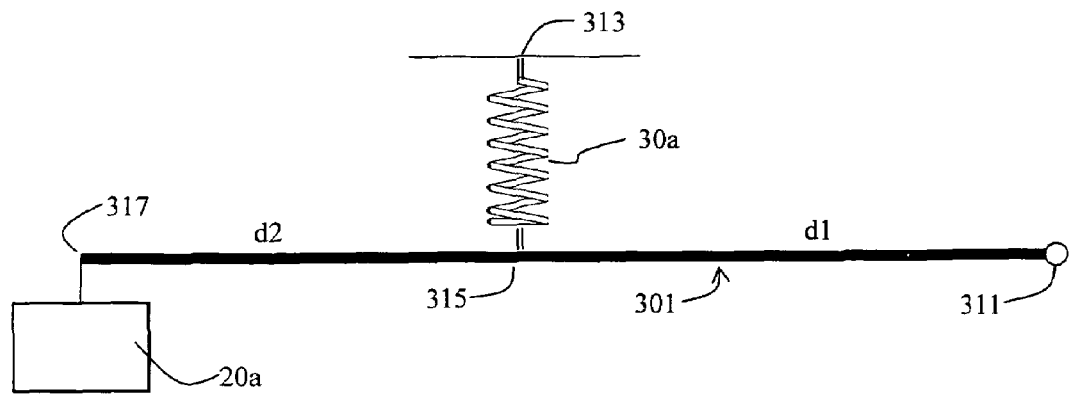
FIG. 3A is a simplified schematic representation of a cantilevered beam to which is affixed a mass and a spring.

As discussed above with reference to FIGS. 1 and 2 and as noted in references (1) and (2), cited above, it has been suggested to overcome problems with existing WECs in which the spar, float and PTO device are exposed to the water by constructing a WEC with a "shell" (float) that is acted upon by the waves and using a "reaction" mass that is totally contained within the float with a spring and power take-off device that couple the reaction mass to the float. In this type of system, the enclosed mass (m) is suspended from or supported by a spring that is connected to the float and whose force constant (k) is tuned to give the desired natural period ($T_n$) of the WEC. A problem with this approach (i.e., selecting the spring force characteristic to yield a desired natural period) is that the required length of the spring is so long (large) that it is not practical to construct it or house it within the float. The length of the spring in still water ($x_0$) can be determined by solving the two following equations simultaneously.

$$m \cdot g = k \cdot x \quad \text{Equation 1}$$

$$\sqrt{k/m} = f_n = 2\pi/T_n \quad \text{Equation 2}$$

Equation 1 shows that the downward force of the reaction mass (m·g) is equal to the upward force of the spring (k·x) in static conditions. Equation 2 shows that the mass (m) and spring force constant (k) can be selected to give the mass-spring oscillator a natural oscillating frequency near that of the predominant waves.

If the two equations are solved simultaneously, the still-water spring length ($x_0$) would be:

$$x_0 = (T_n/2\pi)^2 \cdot g \quad \text{Equation 3}$$

If the mass-spring system is tuned for a 4-second wave (T), the length of the spring ($x_0$) would be approximately 4 meters. If the mass-spring system is tuned for an 8-second wave (T), the length of the spring ($x_0$) would be approximately 16 meters.

FIG. 2 is an illustration of a WEC with a spring that is tuned to provide an oscillatory period of about 8 seconds. As shown, the spring length under static conditions is quite long.

The problems associated with the need to have a long and/or large spring are overcome in systems embodying the invention.

As shown in FIG. 3, WECs embodying the invention include a "float" ("shell" or "hull") 10 which is exposed to the surface waves, an internal "oscillator" formed by a reaction mass 20 and a spring 30, and a power take-off device (PTO) 40 coupled between the mass 20 and float 10 to convert mechanical energy into electric energy.

The shell and internal oscillator are constructed such that, when placed in a body of water and in response to waves in the body of water, there is relative motion between the shell 10 and the internal oscillator's mass 20. For example, the shell moves up and down in response to the up and down motion of the waves. Then, after a phase delay the mass moves, correspondingly. The relative motion of the float and mass/spring is converted by the PTO into electrical energy. The PTO device can be any one of a number of devices, including a linear electric generator (LEG), or a translator that converts linear motion and force to rotary motion and torque, coupled to a rotary electric generator.

The spring 30 which connects the reaction mass 20 to the shell 10 can be a physical spring, such as a coil spring, a leaf spring or a torsional spring. Alternatively, the function of spring 30 may be obtained by controlling the PTO so it behaves like a spring (i.e. back-force increases with displacement). Still further, the function of spring 30 may be obtained by a combination of a physical and an equivalent device.

An important aspect of the present invention which differentiates it from the prior art is the recognition that the length of the spring can be reduced using "simple" or "compound" machines or mechanisms. An example is a spring connected to the reaction mass by a "block and tackle" pulley system, as shown in FIG. 3. In this system, the spring stiffness is increased by, and the spring displacement (travel) is decreased by, the multiplying ratio of the pulley system. It is much easier to construct a short, stiff spring than it is to construct a long, soft spring. It is also easier to fit such a short stiff spring inside a WEC buoy. Even if it is possible to construct a long spring with the proper force-displacement characteristic, the volume of the WEC buoy occupied by the spring and reaction mass would cause the WEC buoy to be long and its hydrodynamic performance could be adversely impacted.

In the WEC embodying the invention shown in FIG. 3, the float (10), loosely anchored to the sea floor (11), is allowed to move up and down with the waves. A "reaction" mass (20) is contained inside the shell (10). Its motion is guided by a set of low-friction rails or guides (13). The motion of the reaction mass is limited by a set of end-stops (lower stops 15 and upper stops 17) that can be sets of springs or dampers (15, 17) or a combination thereof. The reaction mass (20) is connected to a cable (19) or rope that is connected to an "oscillator" spring (30) with the cable or rope passing through a set of pulleys. The oscillator spring (30) is connected at one end (via the pulley arrangement) to one end of the cable (19) and at its other end to the float (10).

An optimum value of spring force constant (k) can be determined. If a 4:1 pulley multiplication ratio is used (as shown in FIG. 3), the length of the spring can be reduced and the force constant of the spring can be increased by the pulley multiplication ratio, or four. The benefit is that the spring is four times shorter than that which would be required without the pulleys. Further, it becomes practical to adjust the location of the connection point of the oscillator spring (30) to the float (10) in a way that moves the neutral position of the reaction mass (20) in, or to, a desired location. For example, one can load the pulley system and spring with the inertia mass. The mass would initially be low in the float. With the spring kept under tension, the mass could be raised and the cable shortened such that the mass is in the desired neutral position. There are numerous alternative arrangements of the pulleys and spring.

Figure 3B:
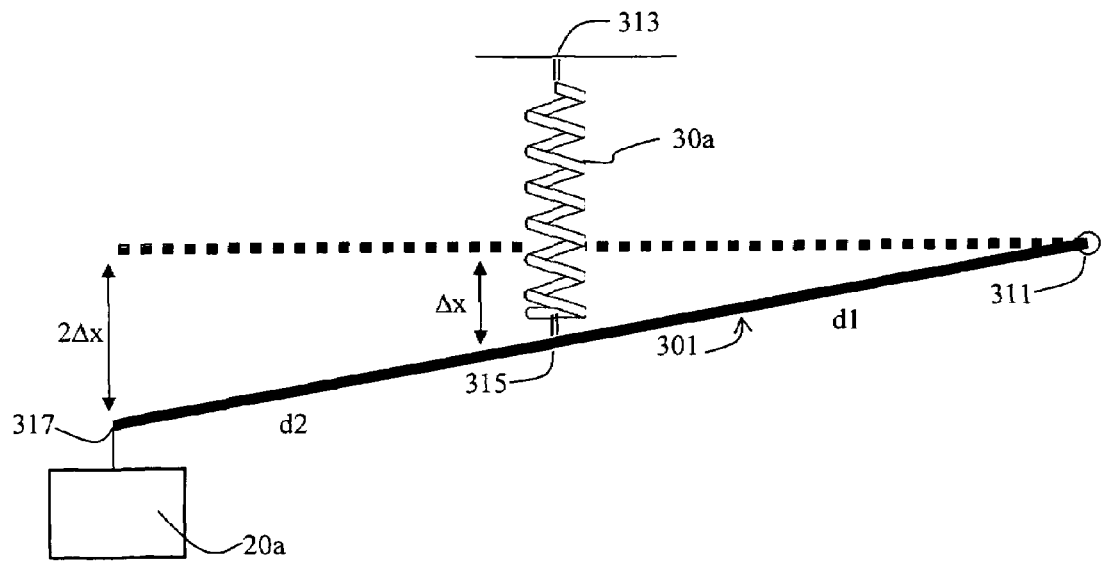
FIG. 3B is a simplified schematic representation of a cantilevered beam illustrating, for example, that, in accordance with the invention, a displacement of the mass by a distance 2X results in causing the spring to be extended only by a distance X.

FIGS. 3A and 3B may be used to illustrate the operation of the system of FIG. 3 which embodies the invention. FIG. 3A illustrates the system at rest. For this condition, a cantilevered arm 301 is shown anchored at an end point 311 with a spring 30a connected between the midpoint 315 of the beam 301 and a fixed point 313. A mass 20a is shown connected to the other end 317 of the cantilevered beam 301. The figure shows a distance d1 between point 311 and point 315 and a distance d2 between point 315 and end point 317. Conceptually and actually, the spring need not be connected to the midpoint; that is d1 need not equal d2.

FIG. 3B shows that when the mass 20a is moved down a distance "2X", the spring 30a has been extended for only the distance "X". It should be evident from the figures that ratio of d1 to d2 may be varied to cause the displacement of the spring to be a variable function of the displacement of the reaction mass. However, in all instances embodying the invention, the linear displacement of the mass will always be greater than the effective displacement of the spring.

The pulley system and mass may be designed such that a rapid acceleration of the float (10) and/or reaction mass (20) does not cause the cable (19) to go slack and get jammed in the pulleys.

Figure 4:
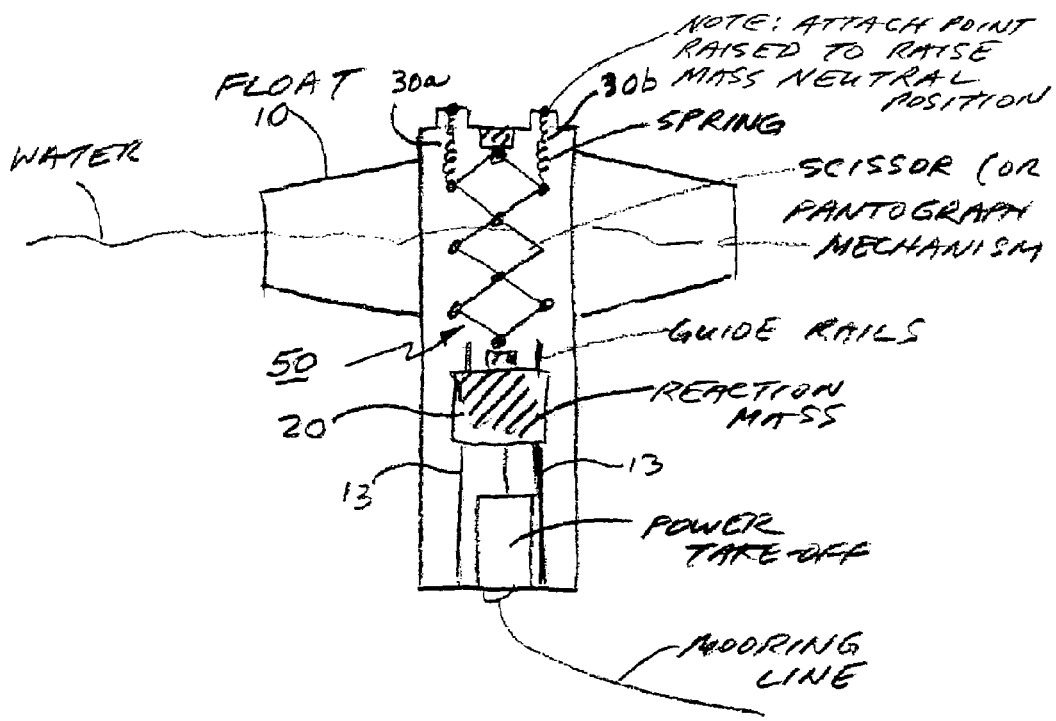
FIG. 4 is an idealized drawing of another WEC embodying the invention in which a scissor mechanism is used to enable the use of a "short" (compact) spring.

FIG. 4 shows a system in which a scissor mechanism (50) is placed between the float (10) and mass (20). A set of springs (30a and 30b) are shown connected between the top portion of the float and selected points of the scissor mechanism. The required force of the spring is equal to that of a single long spring multiplied by the scissor mechanism mechanical force multiplication ratio. The length of the spring is decreased by the same ratio. The springs could also be attached to different points (e.g., at the bottom) of the scissor assembly.

Figure 5:
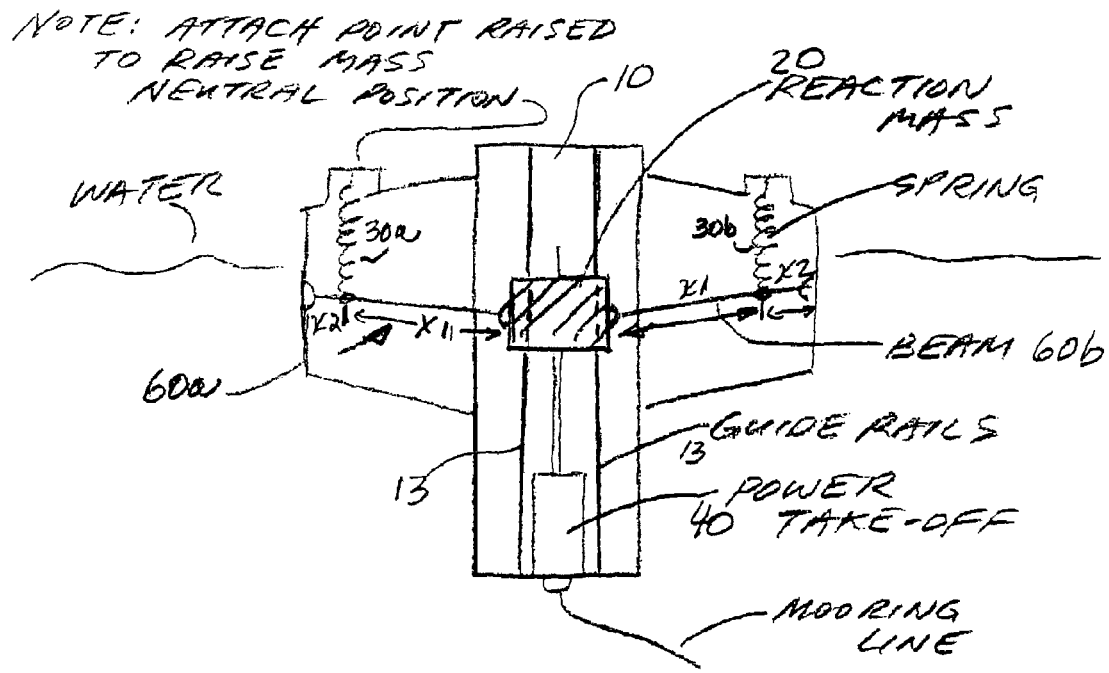
FIG. 5 is an idealized drawing of still another WEC embodying the invention in which a cantilevered beam is used to enable the use of a "short" (compact) spring.

FIG. 5 illustrates another arrangement for enabling relatively short springs to function like much longer springs. Thus, the length of the spring may be shortened. In FIG. 5, the oscillator springs (30a, 30b) are connected to the reaction mass (20) via a set of long beams (60a, 60b). In this embodiment, the springs (30a, 30b) would be located near the fulcrum of the beam (31) such that a shorter, stiffer spring reacts with the reaction mass in the same way as does a long, softer spring that is directly connected to the reaction mass (20). An advantage of this approach is that the end of the spring attached to the float can be raised or lowered so as to put the neutral position of the mass in a desired position.

Figure 6:
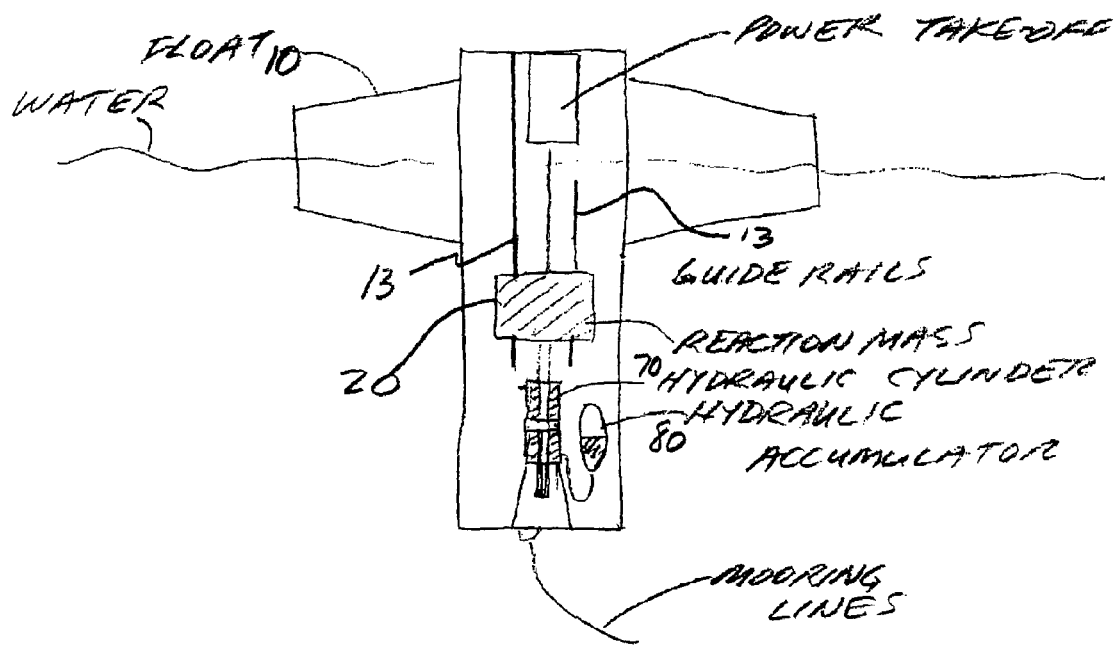
FIG. 6 is an idealized drawing of still another WEC embodying the invention in which a hydraulic cylinder and accumulator function as a spring and replace the need for a physical spring.

Hydraulic Spring Implementation (FIG. 6)

Figure 10A:
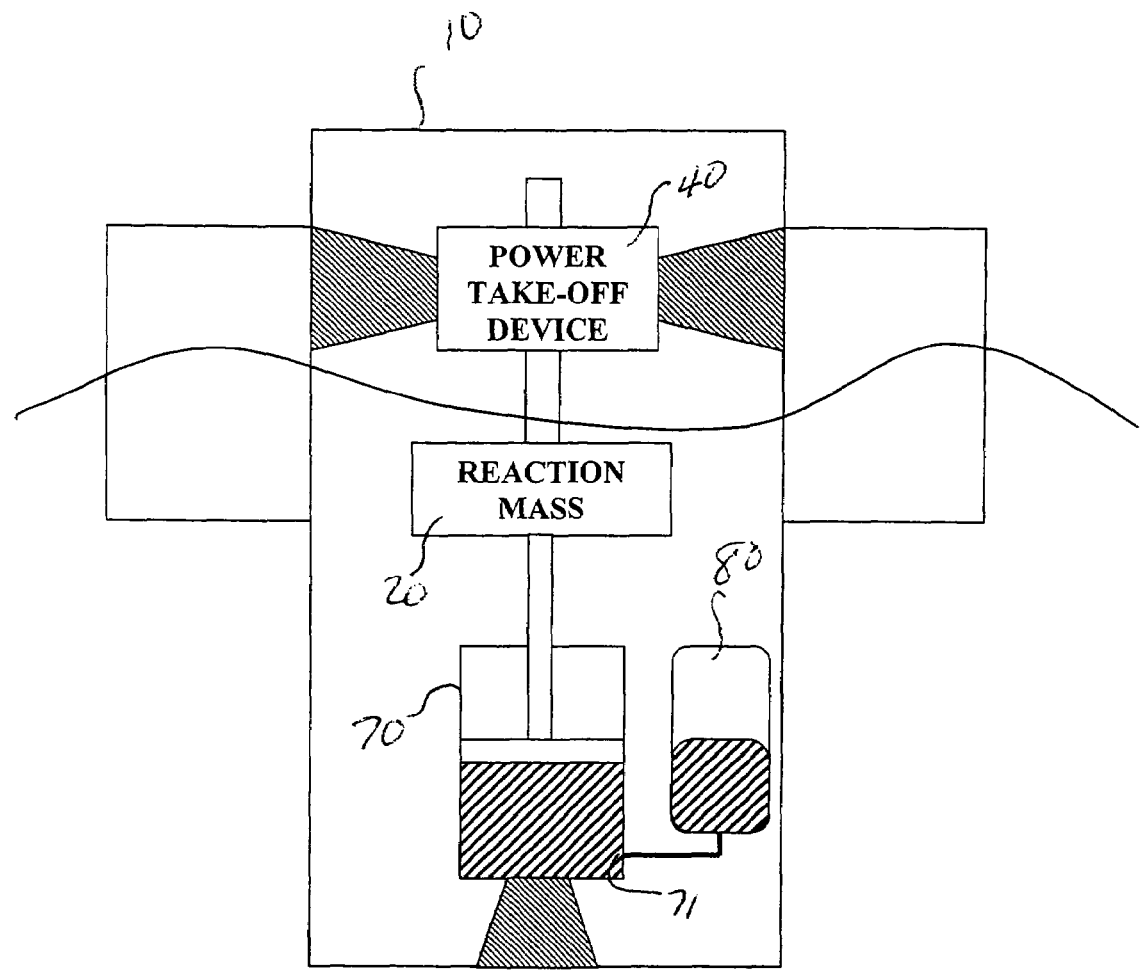
FIGS. 10a, 10b and 10c are idealized representations of parts of the system of FIG. 6 illustrating different interconnections of a hydraulic cylinder with an accompanying accumulator.
Figure 10B:
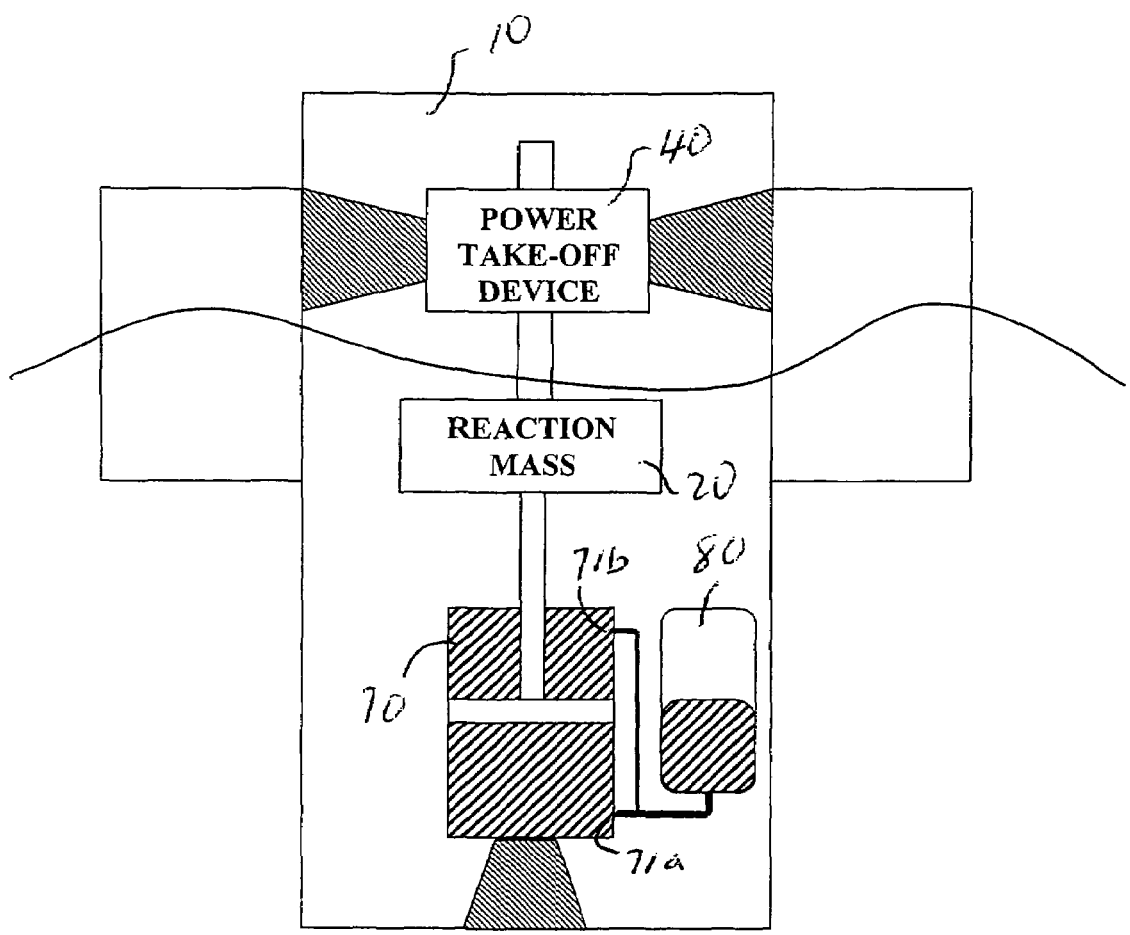
Figure 10C:
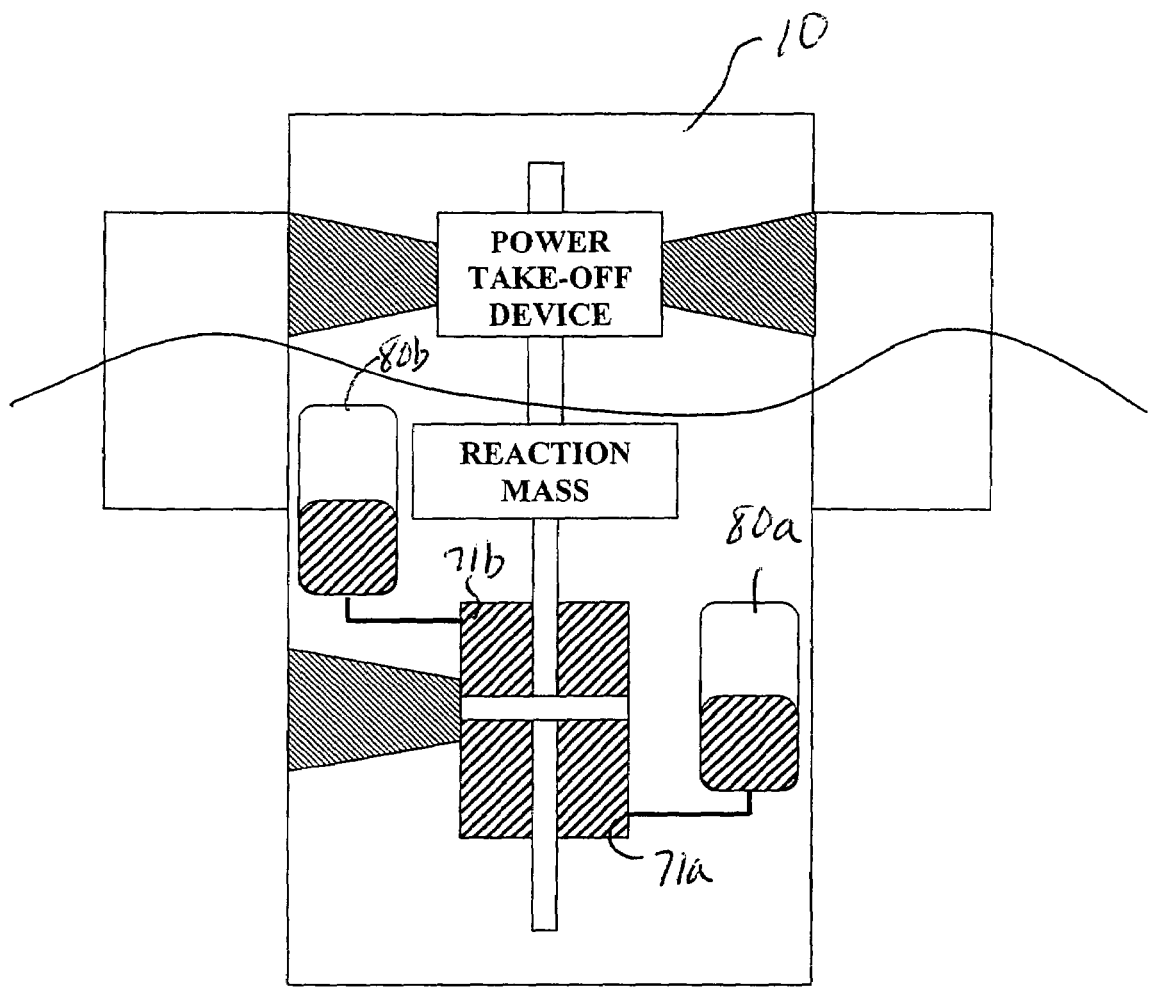

FIG. 6 illustrates that a physical spring may be replaced by the combination of a hydraulic cylinder 70 and a hydraulic accumulator 80. Thus, one can use a hydraulic cylinder coupled to a large accumulator (see FIG. 6). Three alternative hydraulic system arrangements are shown in FIGS. 10a, 10b and 10c. In the simplest arrangement, shown in FIGS. 6 and 10a, a hydraulic cylinder (70) is placed between the reaction mass (20) and the float (10). One port (71) of the hydraulic cylinder (70) is connected to a hydraulic accumulator (80). (As illustrated in FIGS. 10b and 10c there are other possible interconnections of the hydraulic cylinder and accumulator for better or smoother operation.) The size and pre-charge of the accumulator can be selected in a way that yields the desired initial displacement and springiness (i.e., the effective spring stiffness). The accumulator volume determines the springiness. The accumulator pressure pre-charge determines the initial displacement of the mechanically loaded hydraulic cylinder.

It should be appreciated that there are several other ways to make springs with the desired still-water displacement and operational springiness.

Thus, Applicants' invention resides in part in the recognition that a long spring (which would make the WEC ineffective) may be replaced by a significantly shorter spring or set of springs and/or by introducing a device which can perform the spring function without taking undue space. Further, by making the spring shorter, it is possible to raise the spring attachment point to the float and position the reaction mass where it is best for system operation.

In order to keep the pre-deployed or "dry" mass of the WEC to a minimum, the reaction mass can be a water tank that is filled only after the WEC is deployed in the water. WEC buoy batteries can also be used as the reaction mass.

Figures 11A, 11B, 11C:
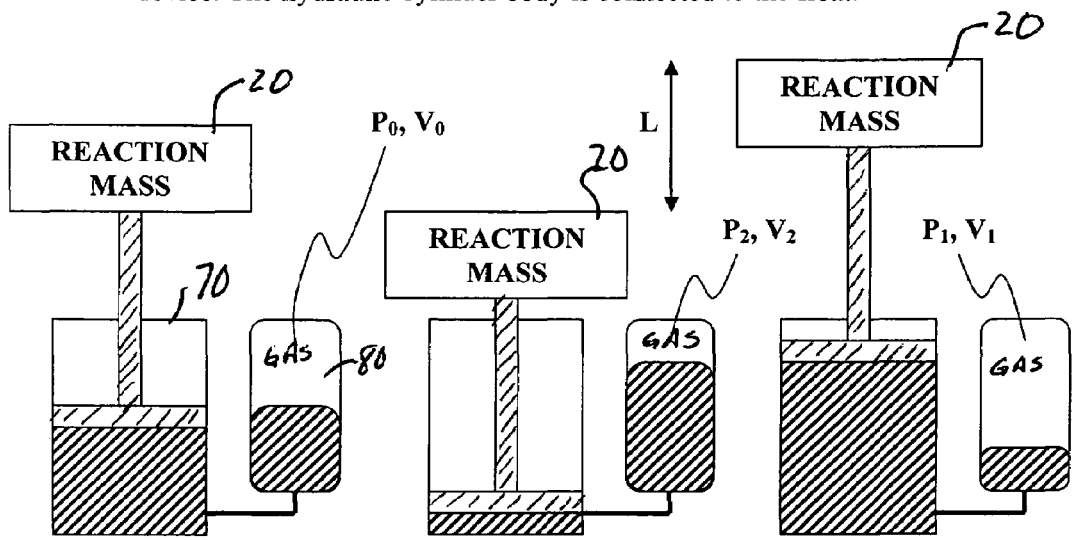
FIGS. 11a, 11b, 11c and 11d are idealized representations of parts of the system of FIGS. 6 and 10a illustrating various positions of a hydraulic cylinder and accumulator in response to different wave conditions causing relative motion between the float and reaction mass.
Figure 11D:
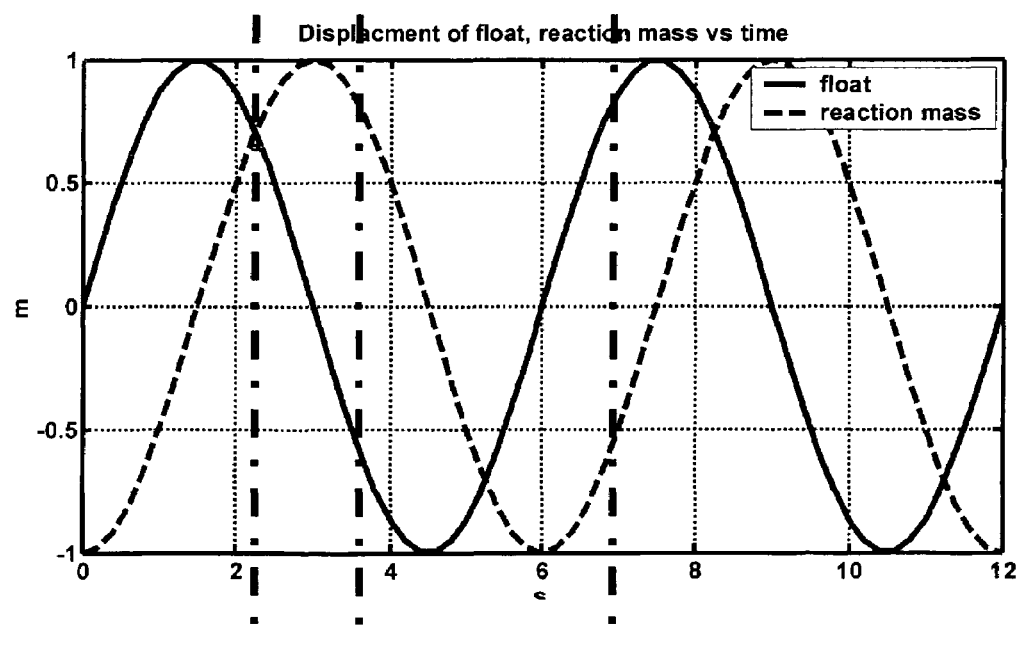

An approach to hydraulic cylinder and accumulator sizing is outlined below. FIGS. 11a, 11b, and 11c illustrate the operation of the system for the relative out-of-phase motion between the float (shell) and the reaction mass (see FIG. 11d) and define some of the system sizing parameters.

K=spring constant, selected along with reaction mass, M, to give a natural oscillating period near the predominant wave period (ref: Equation 2).

M=reaction mass, selected along with spring constant, K, to give natural oscillating period near the predominant wave period (ref: Equation 2).

L=reaction mass stroke (or travel)

g=gravitational acceleration (9.8 m/s$^2$)

$F_0$=force on hydraulic cylinder in still water $F_1$=force on hydraulic cylinder when reaction mass is at top of stroke $F_2$=force on hydraulic cylinder when reaction mass is at bottom of stroke $P_0$=pressure in hydraulic cylinder and accumulator at still water condition $P_1$=pressure in hydraulic cylinder and accumulator when reaction mass is at top of stroke $P_2$=pressure in hydraulic cylinder and accumulator when reaction mass is at bottom of stroke (e.g. 3000 psi or 180 bar)

$V_0$=volume of gas in hydraulic accumulator at still water condition; Note that the accumulator may be charged or precharged with a gas to achieve desired results.

$V_1$=volume of gas in hydraulic accumulator when reaction mass is at top of stroke $V_2$=volume of gas in hydraulic accumulator when reaction mass is at bottom of stroke $\Delta V$=change in gas volume in hydraulic cylinder for maximum reaction mass stroke The force on the hydraulic cylinder when the WEC is in still water, $F_0$, is found as follows:

$$F_0 = M \times g \tag{3}$$

The force on the cylinder at the top of reaction mass travel, $F_1$, is given as follows:

$$F_1 = F_0 - 0.5 \times K \times L \tag{4}$$

The force on the cylinder at the bottom of reaction mass travel, $F_2$, is given as follows:

$$F_2 = F_0 + 0.5 \times K \times L \tag{5}$$

The "working" area of the hydraulic cylinder, $A_c$, that yields the desired maximum pressure, $P_2$, is given as follows:

$$A_c = F_2 \div P_2 \tag{6}$$

Substituting Equation (5) into Equation (6) we get the following expression for cylinder work area:

$$A_c = [(M \times g) + (0.5 \times K \times L)] \div P_2 \tag{7}$$

The change in accumulator gas volume through the reaction mass stroke (travel) is given as follows:

$$\Delta V = L \times A_c \tag{8}$$

If the accumulator gas is an ideal diatomic gas (as nitrogen may be assumed to be) and if heat transfer is minimized (i.e. adiabatic), then the accumulator pressures and volumes at each end of reaction mass travel are related as follows:

$$P_1 V_1^\gamma = P_2 V_2^\gamma \tag{9}$$

Where the quantity $\gamma$ is 1.4. Since $V_2 = V_1 - \Delta V$, Equations (7), (8) and (9) can be re-arranged to provide the expression for the largest gas volume, when the reaction mass is at the top of stroke:

$$V_1 = \Delta V \left(1 - \left(\frac{P_1}{P_2}\right)^{\frac{1}{\gamma}}\right)^{-1}$$

The hydraulic accumulator volume should be selected to be slightly larger than $V_1$.

Figure 7:
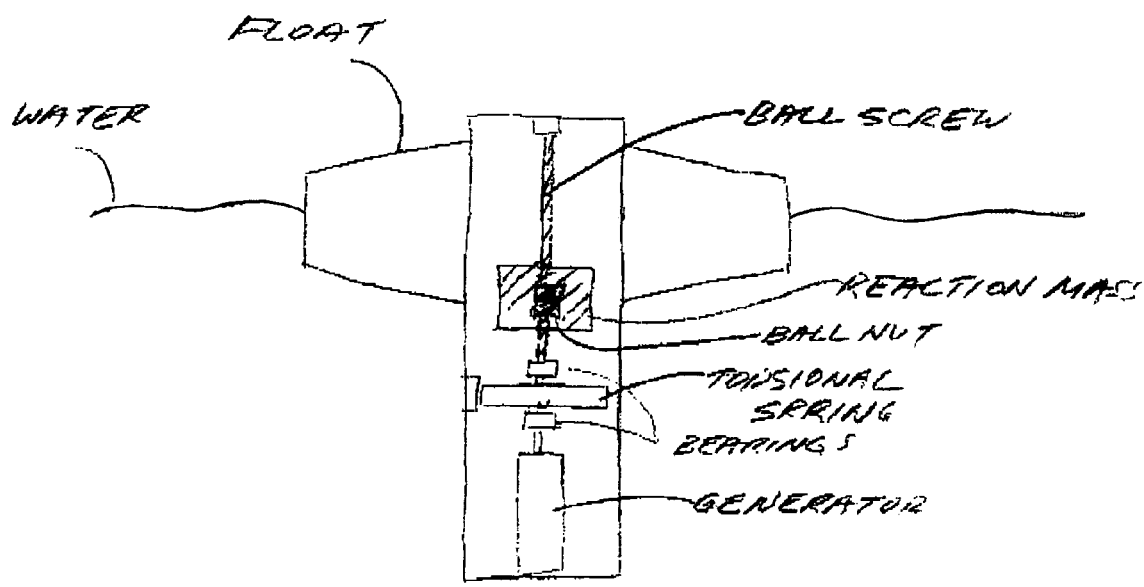
FIG. 7 is an idealized drawing of still another WEC embodying the invention in which a ball screw and torsional spring are used to provide a "short" spring.
Figure 7A:
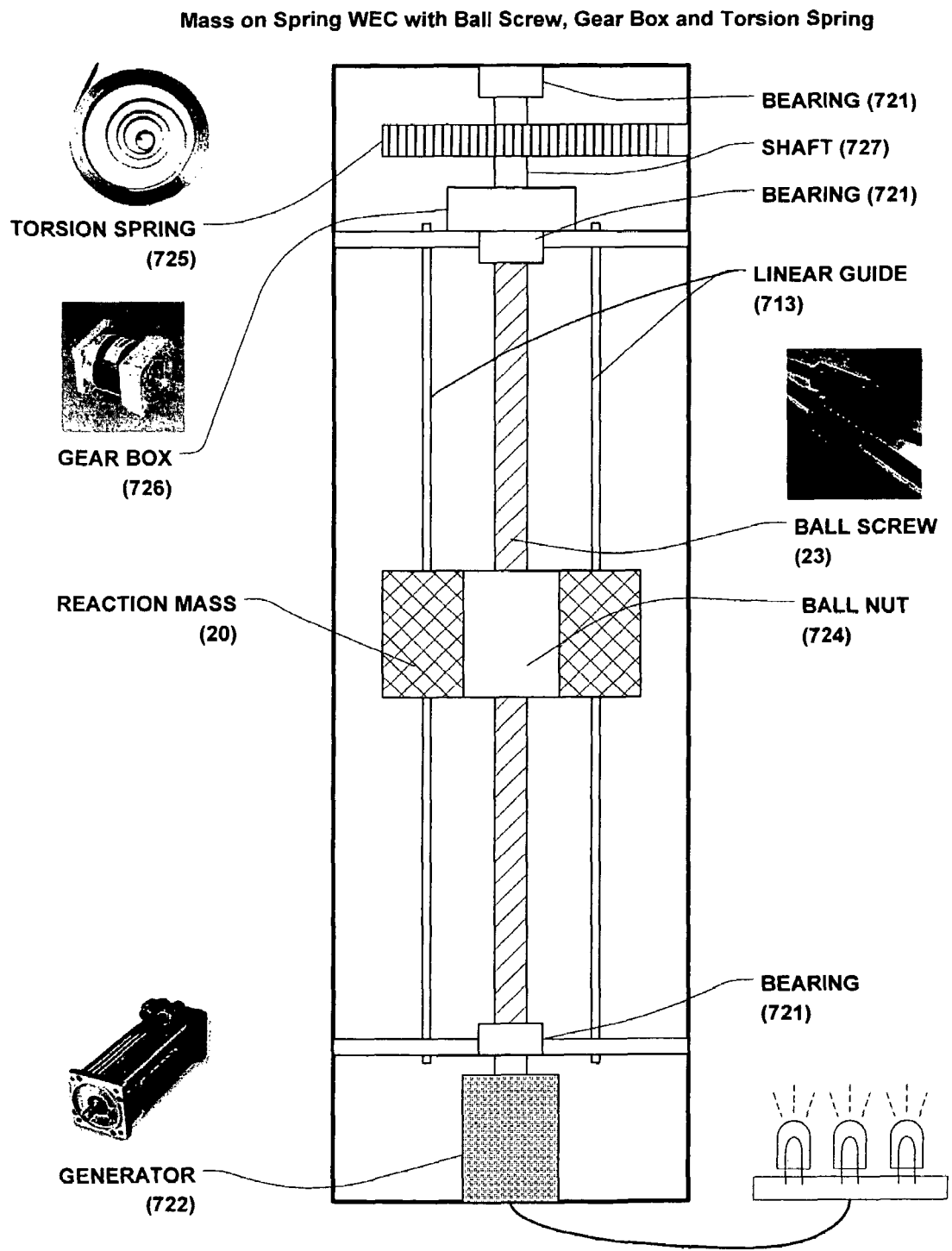
FIG. 7A is an idealized drawing of a WEC embodying the invention in which a ball screw and torsional spring are used to provide a "short" spring, and in which a gear box is used to decrease the range of angular displacement of the torsional spring and thereby increase the torque response of the torsional spring.

Torsion Spring Implementation (FIGS. 7 and 7A)

FIGS. 7 and 7A illustrate that a conventional coil spring or a leaf spring can be replaced by a torsional spring. In FIG. 7, the reaction mass (20) is guided vertically by guide rails (13). These guide rails (13) keep the reaction mass (20) from spinning as it goes up and down. The reaction mass (20) is connected to a translating mechanism that converts linear force and velocity to rotary torque and velocity. A ball screw is one such translator device. As the reaction mass (20) mass moves up and down, the translator rotates. An electric generator is connected to the translator. As the mass moves up and down, the translator rotates clockwise and counterclockwise, and electric power is generated. In FIG. 7, one or more torsional springs are also connected to the translator. The spring torque constant is selected to provide the required spring force constant, K, that gives the WEC buoy a natural period near the predominant wave period. It is possible that the range of linear motion of the reaction mass (20) is such that the range of angular motion of the torsional spring is very large. In this case, it is possible to insert a gear box (e.g., 726 in FIG. 7A) between the linear to rotary device (e.g. the ball screw) such that the range of motion required of the torsional spring is reduced. FIG. 7A shows this arrangement schematically. If the range of motion required of the torsional spring is reduced, then the torsional spring must be stiffer. (e.g. the torque per unit displacement constant for the torsional spring must increase.)

Disposition of the Device

In systems embodying the invention, the WEC may have a "positive" system buoyancy such that it floats on the surface of the water and responds to changes in buoyant force due to passing waves. The WEC may be deployed with some type of mooring device which will keep the WEC in a range of interest while not hindering the motions which lead to energy conversion. The WEC may have a "neutral" system buoyancy such that it remains disposed within the volume of the body of water and responds to changes in hydrodynamic pressure due to passing waves. In this case, the WEC may be deployed with some type of system to assure that the WEC stays at a desired depth. This system which assures the WEC remains at a desired depth may be active (e.g. a system with a depth detector and an adjustable ballast tank) or it may be passive (e.g. a chain descending to the sea-bed.)

Figure 8:
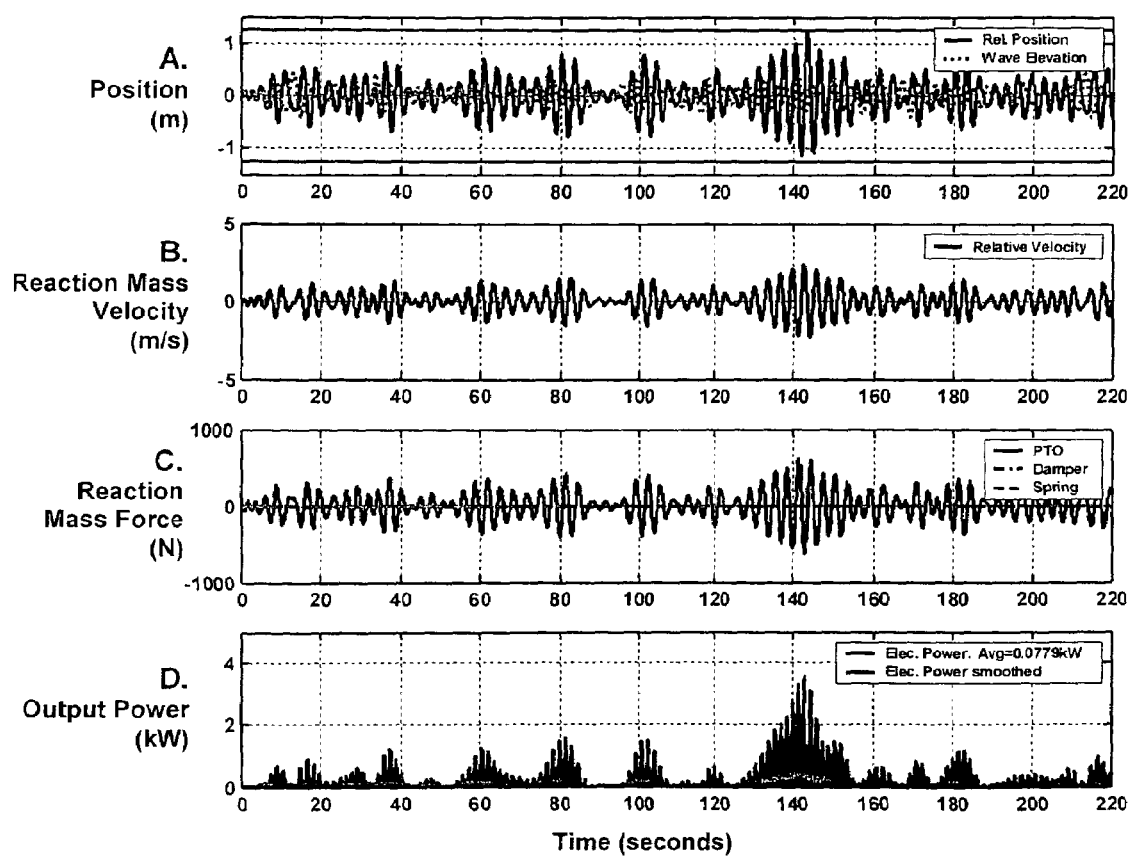
FIG. 8 is a diagram of waveforms showing simulation results for a WEC embodying the invention.
Figure 9:
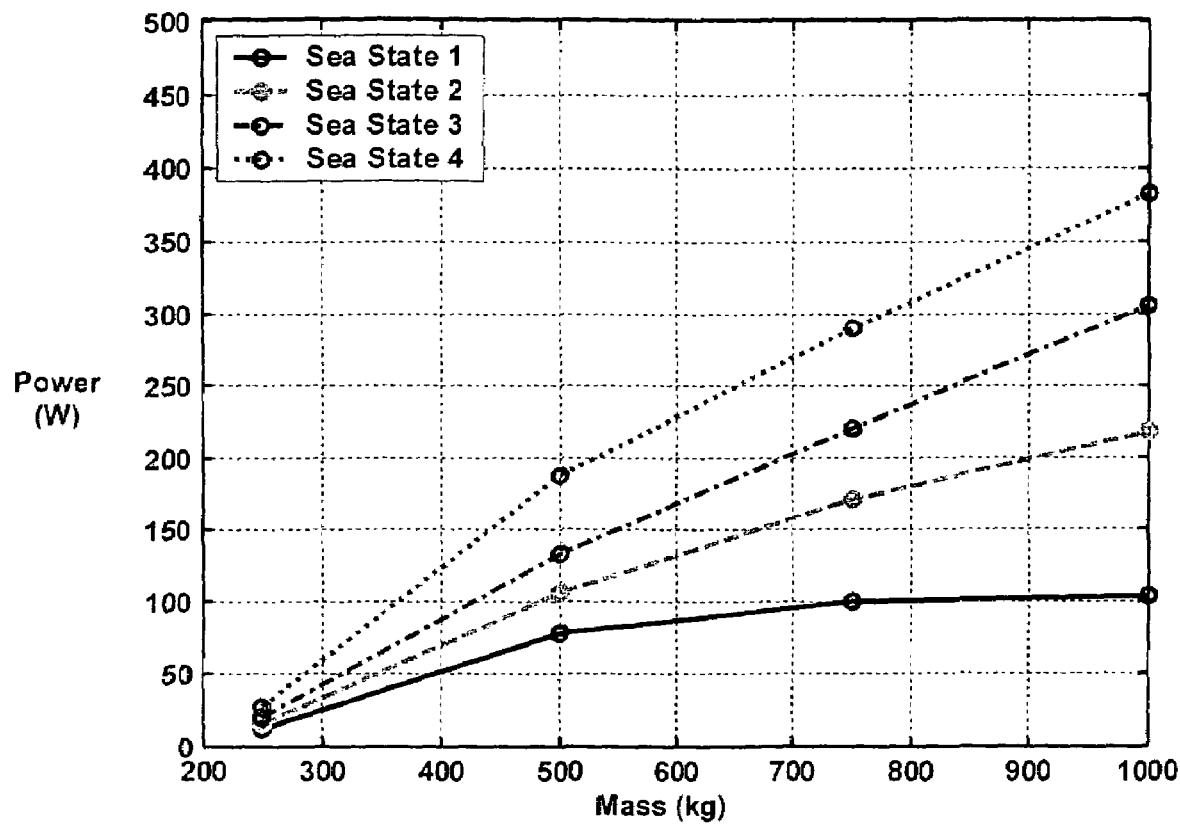
FIG. 9 is a diagram showing the power generated for several different configurations of WECs embodying the invention

Analysis Results (FIGS. 8 and 9)

FIG. 8 shows the results of computer simulation for one combination of reaction mass, spring constant and PTO damping. In the top trace (A), the amplitude of reaction mass motion is seen to exceed that of the wave amplitude. The second trace (B) shows the velocity of the reaction mass relative to the float. The third trace (C) shows the force the reaction mass exerts on the power take-off unit. The fourth trace (D) shows the instantaneous power generated by a WEC embodying the invention.

FIG. 9 shows the results of several computer simulation runs for several "sea state" conditions and several buoy configurations. In this example, the mass of the float and the spring force constant are fixed, and the mass of the reaction mass is varied. As shown, the power output is dependent on the spring force constant, the reaction mass and the sea state.

What is claimed is:

1. A wave energy converter (WEC) system comprising:
   a shell responsive to wave motion in a body of water;
   an internal oscillator including a reaction mass and a spring mechanism; the spring mechanism for coupling the reaction mass to the shell, said internal oscillator mounted within the shell for moving out of phase relative to the shell, when the shell and the internal oscillator are placed in a body of water subject to wave conditions;
   a power take-off (PTO) device coupled between the shell and the internal oscillator for converting their relative motion into electrical energy;
   wherein the PTO and internal oscillator are located within the shell so as to be generally insulated from the body of water; and
   the spring mechanism being coupled to the reaction mass such that the effective linear displacement of the spring mechanism is less than the linear displacement of the reaction mass.

2. A WEC as claimed in claim 1 wherein decreasing the linear displacement of the spring mechanism enables a reduction in the size of the shell.

3. A WEC as claimed in claim 1 wherein the spring mechanism includes a block and tackle pulley system.

4. A WEC as claimed in claim 1 wherein the effective stiffness of the spring mechanism is increased so as to enable a reduction in the displacement of the spring.

5. A WEC as claimed in claim 1 wherein the spring mechanism includes a hydraulic cylinder coupled to an accumulator.

6. A WEC as claimed in claim 5 wherein the accumulator is gas charged.

7. A WEC as claimed in claim 1 wherein the spring mechanism includes a scissor mechanism.

8. A WEC as claimed in claim 1 wherein the spring mechanism includes a cantilevered beam.

9. A WEC as claimed in claim 8 wherein the spring is attached to the shell at a point that makes the cantilevered beam level in the steady-state equilibrium condition so as to make the spring behave in a linear manner.

10. A WEC as claimed in claim 1 wherein the spring mechanism includes a pneumatic cylinder coupled to an accumulator.

11. A WEC as claimed in claim 1 wherein the spring mechanism includes a ball screw coupled to a torsional spring.

12. A WEC as claimed in claim 11 wherein the torsional spring is coupled to the ball screw by a gear box.

13. A WEC as claimed in claim 1 wherein the PTO device functions as part of the spring mechanism.

14. A WEC as claimed in claim 1 wherein the natural frequency of the internal oscillator may be tuned to approximate the frequency of the waves.

15. A WEC as claimed in claim 1 wherein the reaction mass may include the energy storage elements.

16. A WEC as claimed in claim 1 wherein the reaction mass may include a chamber selectively filled with water.

17. A WEC as claimed in claim 16 wherein the chamber is filled with water following deployment of the WEC in a body of water.

18. A wave energy converter (WEC) system comprising:
    a shell responsive to wave motion in a body of water;
    an internal oscillator including a reaction mass and a spring mechanism comprising a hydraulic cylinder and accumulator for coupling the reaction mass to the shell, said internal oscillator mounted within the shell and designed to move out of phase relative to the shell and wherein the shell and oscillator, being constructed such that, when placed in the body of water and in response to waves in the body of water, there is relative motion between the shell and the internal oscillator;

a power take-off (PTO) device coupled between the shell and the internal oscillator for converting the motion between the shell and the internal oscillator into electrical energy;

wherein the PTO and internal oscillator are located within the shell so as to be generally insulated from the body of water; and wherein the shell is designed to be submerged and to include a waterproof cavity in which the PTO and the internal oscillator are contained.

19. A WEC as claimed in claim 18 wherein said WEC includes components to regulate the buoyancy of the WEC so the WEC can remain underwater in a neutrally buoyant state.

20. A wave energy converter (WEC) system comprising:

a shell responsive to wave motion in a body of water;

an internal oscillator including a reaction mass and a spring mechanism for coupling the reaction mass to the shell, said internal oscillator coupled to the shell and designed to move out of phase relative to the shell and wherein the shell and oscillator, being constructed such that, when placed in the body of water and in response to waves in the body of water, there is relative motion between the shell and the internal oscillator;

a power take-off (PTO) device coupled between the shell and the internal oscillator for converting the motion between the shell and the internal oscillator into electrical energy; and wherein the spring mechanism is formed such that for a given linear displacement of the reaction mass the effective displacement of the spring mechanism is less than that of the reaction mass.

21. A wave energy converter (WEC) system comprising:

a shell responsive to wave motion in a body of water;

the combination of a reaction mass and a spring mechanism coupling the reaction mass to the shell, said combination mounted within the shell and designed to move out of phase relative to the shell and wherein when the shell and the combination are placed in the body of water and in response to waves in the body of water, there is relative motion between the shell and the combination;

a power take-off (PTO) device, located within the shell, coupled between the shell and the reaction mass for converting their relative motion into electrical energy; and the spring mechanism being coupled to the reaction mass such that the effective displacement of the spring mechanism is less than the linear displacement of the reaction mass.

22. A WEC as claimed in claim 21 wherein the mass of the reaction mass and the force constant of the spring are tuned to give the desired natural frequency of the WEC.

* * * * *